US012363087B2

(12) United States Patent
Diffloth et al.

(10) Patent No.: US 12,363,087 B2
(45) Date of Patent: Jul. 15, 2025

(54) MACHINE LEARNING MODEL FEATURE SHARING FOR SUBSCRIBER IDENTITY MODULE HIJACK PREVENTION

(71) Applicant: AT&T Intellectual Property I, L.P., Atlanta, GA (US)

(72) Inventors: Antoine Diffloth, Frisco, TX (US); Prince Paulraj, Coppell, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 246 days.

(21) Appl. No.: 17/989,284

(22) Filed: Nov. 17, 2022

(65) Prior Publication Data

US 2024/0171558 A1 May 23, 2024

(51) Int. Cl.
*H04L 9/40* (2022.01)
*G06F 21/31* (2013.01)

(52) U.S. Cl.
CPC ............ *H04L 63/08* (2013.01); *G06F 21/316* (2013.01); *H04L 2463/082* (2013.01)

(58) Field of Classification Search
CPC ... H04L 9/32; H04L 9/40; H04L 63/08; H04L 63/10; H04L 67/22; G06F 21/31; G06F 21/316; G06N 99/005
USPC ............................................................ 726/22
See application file for complete search history.

(56) References Cited

U.S. PATENT DOCUMENTS 8,006,300 B2 * 8/2011 Mizrah ................. H04L 9/3271 726/19
8,295,898 B2 * 10/2012 Ashfield ............... H04L 63/107 455/456.1
9,781,148 B2 * 10/2017 Mahaffey .............. H04W 12/02
10,057,227 B1 * 8/2018 Hess ........................ G06F 21/31
10,178,223 B1 * 1/2019 Marimuthu .......... H04B 1/3816
11,051,163 B1 * 6/2021 Smith ................... H04W 12/06
11,080,375 B2 * 8/2021 Fuentes ................. H04L 67/306
2011/0072499 A1 * 3/2011 Lin ..................... H04W 12/069 455/411
2020/0042723 A1 * 2/2020 Krishnamoorthy ..... G06F 21/45

(Continued)

OTHER PUBLICATIONS

TechTarget, "5 Common Authentication Factors to Know", accessed from https://www.techtarget.com/searchsecurity/feature/5-common-authentication-factors-to-know on Jan. 6, 2023, 6 pages.

(Continued)

*Primary Examiner* — James N Fiorillo

(57) ABSTRACT

A processing system including at least one processor may obtain a first input data set associated with a telephone number from a first service provider that implements a multi-factor authentication process for permitting an access to a service of the first service provider and may apply at least the first input data set to a machine learning model implemented by the processing system to obtain a risk score associated with the telephone number for a subscriber identity module swap of a subscriber identity module, where the machine learning model is trained to generate the risk score associated with the telephone number in accordance with at least the first input data set. The processing system may then perform at least one remedial action associated with the telephone number and the subscriber identity module, in response to the risk score.

20 Claims, 4 Drawing Sheets

300

START — 305

TRAIN A MACHINE LEARNING MODEL (MLM) USING TRAINING DATA COMPRISING AT LEAST A PLURALITY OF DATA SETS FROM AT LEAST ONE SERVICE PROVIDER, THE PLURALITY OF DATA SETS ASSOCIATED WITH A PLURALITY OF TELEPHONE NUMBERS, WHERE EACH OF THE PLURALITY OF DATA SETS COMPRISES A LABEL INDICATIVE OF WHETHER THE DATA SET IS ASSOCIATED WITH AN OCCURRENCE OF AN UNAUTHORIZED SUBSCRIBER IDENTITY MODULE (SIM) SWAP — 310

OBTAIN A FIRST INPUT DATA SET ASSOCIATED WITH A TELEPHONE NUMBER FROM A FIRST SERVICE PROVIDER THAT IMPLEMENTS A MULTI-FACTOR AUTHENTICATION PROCESS FOR PERMITTING AN ACCESS TO A SERVICE OF THE FIRST SERVICE PROVIDER — 320

OBTAIN AT LEAST A SECOND INPUT DATA SET ASSOCIATED WITH THE TELEPHONE NUMBER FROM AT LEAST A SECOND SERVICE PROVIDER — 330

APPLY AT LEAST THE FIRST INPUT DATA SET TO THE MLM IMPLEMENTED BY THE PROCESSING SYSTEM TO OBTAIN A RISK SCORE ASSOCIATED WITH THE TELEPHONE NUMBER FOR A SIM SWAP OF A SIM, WHERE THE MLM IS TRAINED TO GENERATE THE RISK SCORE ASSOCIATED WITH THE TELEPHONE NUMBER IN ACCORDANCE WITH AT LEAST THE FIRST INPUT DATA SET — 340

PERFORM AT LEAST ONE REMEDIAL ACTION ASSOCIATED WITH THE TELEPHONE NUMBER AND THE SIM, IN RESPONSE TO THE RISK SCORE — 350

OBTAIN FEEDBACK FROM AT LEAST ONE SOURCE REGARDING AN ACCURACY OF THE RISK SCORE — 360

UPDATE THE MACHINE LEARNING MODEL IN ACCORDANCE WITH THE FEEDBACK — 370

END — 395

(56) References Cited

U.S. PATENT DOCUMENTS

| | | | | |
|---|---|---|---|---|
| 2020/0402054 | A1* | 12/2020 | Manjunath | G06Q 20/4016 |
| 2020/0410378 | A1* | 12/2020 | Williams | G06N 3/08 |
| 2021/0282018 | A1* | 9/2021 | Talwar | H04L 63/107 |
| 2022/0248233 | A1* | 8/2022 | Reeves | H04L 9/3231 |
| 2022/0400384 | A1* | 12/2022 | Byrne | H04W 12/72 |
| 2023/0023944 | A1* | 1/2023 | Chahine | A61B 5/6804 |
| 2023/0040721 | A1* | 2/2023 | Chhibber | G06N 20/00 |
| 2023/0041015 | A1* | 2/2023 | Chhibber | G06N 20/00 |
| 2023/0216956 | A1* | 7/2023 | Nesargi | H04M 3/5141 379/265.09 |
| 2023/0283599 | A1* | 9/2023 | Bloom | G07F 19/211 726/7 |
| 2023/0308453 | A1* | 9/2023 | Lefèvre | H04L 41/50 |
| 2023/0362298 | A1* | 11/2023 | Kwok | H04M 3/382 |
| 2024/0015515 | A1* | 1/2024 | Jaiswal | H04W 12/126 |
| 2024/0089117 | A1* | 3/2024 | Vivek | H04L 9/3247 |
| 2024/0107301 | A1* | 3/2024 | Koral | H04W 12/63 |

OTHER PUBLICATIONS

Thomas, “Training Machine Learning Models from Sensitive Data”, Sensitive Data, Nov. 16, 2021, accessed from https://fastdatascience.com/sensitive-data-machine-learning-model/.

Google Cloud, “De-identify and re-identify sensitive data” accessed from https://cloud.google.com/dlp/docs/inspect-sensitive-text-de-identify on Aug. 9, 2022, 15 pages.

* cited by examiner

400

MACHINE LEARNING MODEL FEATURE SHARING FOR SUBSCRIBER IDENTITY MODULE HIJACK PREVENTION

The present disclosure relates generally to multi-factor authentication and securing of network-based communications, and more particularly to methods, computer-readable media, and apparatuses for performing at least one remedial action in response to a risk score associated with a telephone number for a subscriber identity module swap where the risk score is obtained via a machine learning model in accordance with an input data set associated with the telephone number from a first service provider that implements a multi-factor authentication process.

BACKGROUND

Increasingly, access to online accounts with sensitive information may require an additional form of authentication besides a password. For instance, this may involve an additional input from a mobile device, e.g., two-factor authentication (2FA). However, if the mobile device falls into the hands of an attacker, it may be possible for the attacker to override this second verification mechanism.

SUMMARY

In one example, the present disclosure describes a method, computer-readable medium, and apparatus for performing at least one remedial action in response to a risk score associated with a telephone number for a subscriber identity module swap where the risk score is obtained via a machine learning model in accordance with an input data set associated with the telephone number from a first service provider that implements a multi-factor authentication process. For example, a processing system including at least one processor deployed in a communication network may obtain a first input data set associated with a telephone number from a first service provider that implements a multi-factor authentication process for permitting an access to a service of the first service provider and may apply at least the first input data set to a machine learning model implemented by the processing system to obtain a risk score associated with the telephone number for a subscriber identity module swap of a subscriber identity module, where the machine learning model is trained to generate the risk score associated with the telephone number in accordance with at least the first input data set. The processing system may then perform at least one remedial action associated with the telephone number and the subscriber identity module, in response to the risk score.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
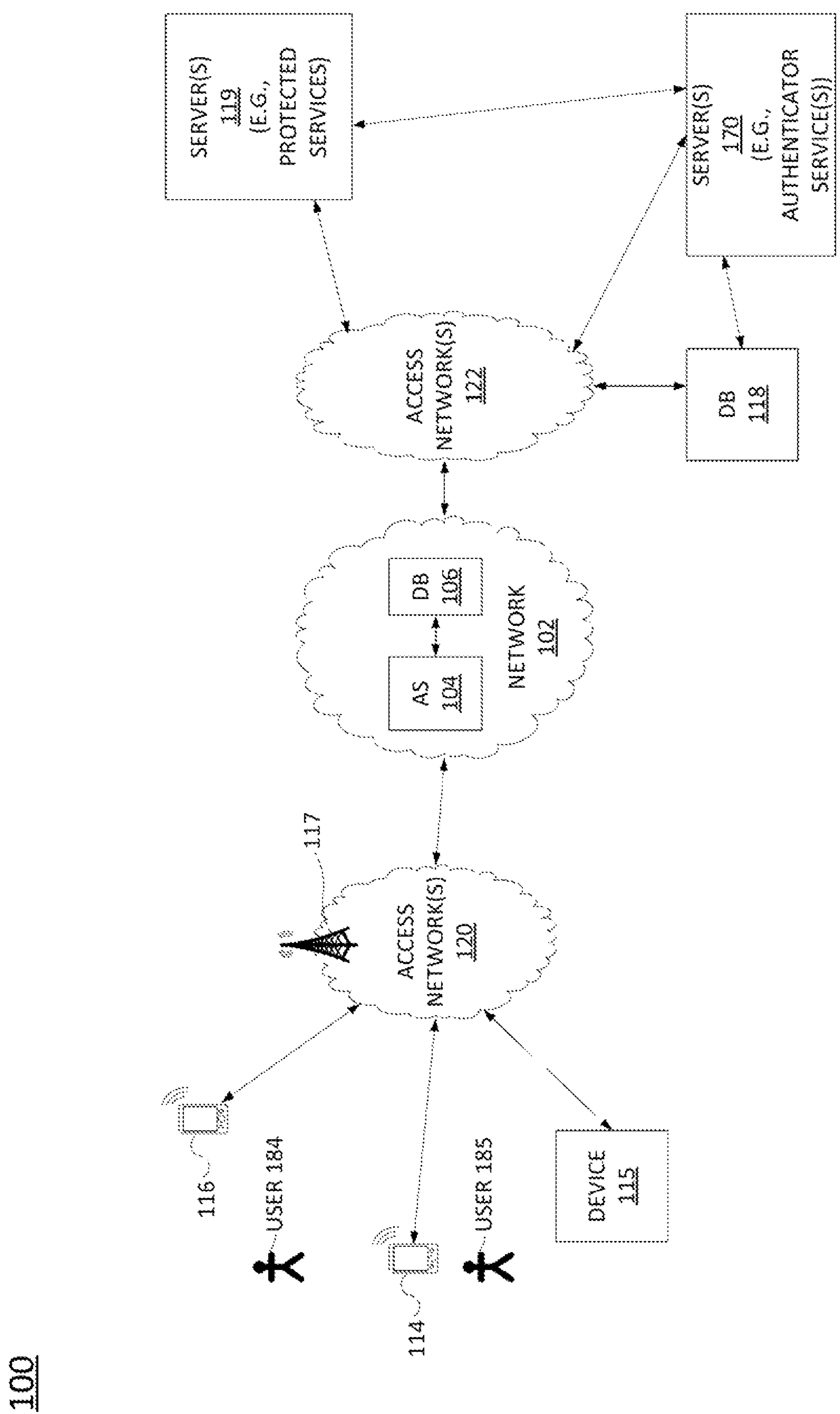
FIG. 1 illustrates an example network related to the present disclosure.

Examples of the present disclosure describe methods, computer-readable media, and apparatuses for performing at least one remedial action in response to a risk score associated with a telephone number for a subscriber identity module swap where the risk score is obtained via a machine learning model in accordance with an input data set associated with the telephone number from a first service provider that implements a multi-factor authentication process. Notably, access to online accounts with sensitive information may require an additional form of authentication besides a password. For instance, this may involve an additional input from a mobile device, e.g., two-factor authentication (2FA). However, if the mobile device falls into the hands of an attacker, it may be possible for the attacker to override this second verification mechanism. Examples of the present disclosure provide for detection of fraudulent/non-authorized subscriber identity module (SIM) swapping and/or the detection of increased risk thereof with respect to a particular telephone number and/or account. In particular, examples of the present disclosure utilize information from sources external to a communication network, such as a bank or other service providers that implement a two-factor authentication process, in determining that an unauthorized SIM swap may have or is likely to occur. In addition, insofar a telephone number is an important component of many two-factor authentication processes, examples of the present disclosure also provide an additional measure of security in connection with secondary identity verification, or secondary authentication (e.g., 2FA or multi-factor authentication (MFA)).

The general progression of a SIM swap fraud may be as follows. First, a fraudster may use social engineering or a compromised insider to convince a mobile network operator to port a customer's voice and text/Short Message Service (SMS) services from the legitimate customer's mobile device to a device controlled by the fraudster. The fraudster now possesses an important part of the victim's identity. The fraudster can receive identification phone calls or secondary authentication (e.g., 2FA/MFA) codes from financial institutions, or make calls into financial institutions. One end goal is to transfer assets out of the victim's bank account(s), crypto-currency account(s), or the like.

Notably, organized fraud rings are becoming increasingly sophisticated. They gather data on their targets from one company in order exploit a vulnerability at another company. They share data and TTPs (tactics, techniques, and procedures) on the dark web. On the other hand, targeted companies and individuals may operate in individual silos. Organizations can build machine learning models to protect themselves and their customers against fraud, but the effectiveness of these algorithms is limited and based upon a limited view with each organization's own data. For example, a financial institution may not know which mobile numbers/devices are reliably in the hands of its actual customers at any given moment in time. In addition, a financial institution may not know whether one of its customers has been the victim of fraud/attempted fraud on a mobile account. Similarly, a network operator may not know which telephone numbers (and/or the customers/accounts associated therewith) are high-risk (e.g., ultra-high net worth individuals, crypto currency holders, previous victims of identity theft, individuals with privileged organizational roles (e.g., a chief-financial officer of a large organization, an individual who is permitted to access an organizations cloud infrastructure account, and so forth), individuals with a prominent social media presence, etc.). In addition, where a SIM swap fraud may involve a port-in/port-out of a number between two network operators, the source and destination networks may be missing valuable information pertaining to half of the transaction.

In one example, the present disclosure provides a system or platform to allow multiple parties to share data sets securely, and to allow the development of artificial intelligence (AI) and/or machine learning (ML) models using federated data for more complete knowledge of risk exposure and fraud activity (e.g., particularly related to SIM swap). In one example, the present disclosure may also provide data and risk modeling as a service, e.g., by a network operator, while addressing the common interest of protecting customer identity and eliminating fraud. Network operators and financial institutions have a common interest in protecting from SIM swap fraud. In addition, many other entities rely on digital identities and often use SMS-based MFA for authentication and access, such as social media platforms, email service providers, cloud service providers, health care providers, federated identity providers (including authentication apps), and so forth. SIM swapping may similarly be used to obtain fraudulent access to such services, which may be used to secondarily victimize the target, such as obtaining personal information and leaking such information to the Internet, or threatening to do so unless a ransom is paid, impersonating the victim via social media postings for monetary gain or to inflict reputational damage, impersonating an individual within an organization for additional social engineering (e.g., impersonating a CFO asking accounting department personnel to wire funds to a fraudster's account), and so forth.

As noted above, examples of the present disclosure may specifically utilize information from sources external to a communication network, such as a bank or other service providers that implement a two-factor authentication process, in determining that an unauthorized SIM swap may have or is likely to occur. To illustrate, financial institutions and social media platforms may provide information on high risk/high value customers, history of fraud/fraud attempts, failed logins, recent account changes, and so forth. Similarly, cloud service providers, Internet service providers (ISPs), or other internet infrastructure providers may provide information on high-risk activities (such as non-https browsing, visiting of foreign top-level domains and/or those known to be associated with increased fraudulent activity (e.g., not necessarily related to SIM swap, but which may be tolerant of a wide range of malicious activity)), Domain Name Service (DNS) lookups, account changes, Internet Protocol (IP) geo-location information, and so forth.

In one example, data from multiple sources may be combined for ML-based detection of SIM swap fraud (or a risk level thereof). For instance, data from a financial institution may indicate that an account associated with a telephone number (e.g., a customer having the telephone number) is a high-value account. In addition, data from a social networking platform may indicate that the same customer associated with the telephone number is also a prolific social media contributor with a large number of subscribers, followers, friends, or the like. In such case, the associated telephone number may have a significantly higher risk of being targeted for SIM swap fraud than a telephone number associated with an account holder having a low-value account (e.g., under $10,000, etc.), who is not a high-volume social media participant, etc. In addition to these factors, data from the financial institution and/or the social media platform may indicate a volume or rate of login attempts to respective accounts, a geographic distribution of the login attempts, a distribution of unique devices associated with the login attempts, and so forth. Collectively, these points of data from the different sources may be processed as inputs to a trained machine learning model to generate a SIM swap risk score as an output.

In one example, network event data (e.g., from a communication network associated with the telephone number) may be further utilized for ML-based detection of SIM swap fraud (or a risk level thereof) in addition to data from at least one external source that is different from the communication network (e.g., a financial institution, an email service provider, a social media platform, etc.). For instance, the network event data may include access point authentication data associated with the telephone number, malware infection data associated with the telephone number, identifier matching data associated with the telephone number (e.g., account changes, such as changing an email address of a subscriber account associated with telephone number, adding another authorized individual to an account, changing an address associated with the account, etc.), a message volume associated with the telephone number, a message volume associated with the telephone number specific to a plurality of authentication services, unauthorized base station information pertaining to a location associated with the telephone number, and so forth. Additional data from a network operator that may be used for ML-based SIM swap detection include a number of attempted in-person transactions at retail locations of the network operator, a geographic distribution of the locations, and so forth, a number of attempted online account changes that are not necessarily related to an account identifier (e.g., adding a new line, attempting to purchase one or multiple new endpoint devices on an extended payment plan, and so on).

In one example, individuals or entities associated with a telephone number may provide personal data that may be further used for ML-based detection of SIM swap fraud. For instance, a user may specifically indicate categories that apply to the user, such as "high-value account holder" with a financial institution, "cryptocurrency owner," "high-profile social media presence," etc. Likewise, a user may indicate more generally "high risk," "medium risk," or the like, "prior identity theft victim," etc. In one example, a geofence or location may also be indicated. For example, a user may specify a home, or an area that is frequented by the user such that when combined with other data, may tend to indicate legitimate or illegitimate activity. For instance, social media postings that are geotagged as being near the user's home address may tend to be associated with legitimate use, while social media postings from thousands of miles away may be more indicative of potential malicious activity, e.g., including SIM swap fraud.

In one example, the present disclosure may comprise a SIM swap fraud risk assessment system that may include a service and user interface layer: e.g., service application programming interfaces (APIs), development and modeling environments, and so forth. This layer may be used by individuals or entities associated with telephone numbers to provide information to the system and/or to receive warnings or other communications from the system pertaining to SIM swap fraud risk assessment. This layer may also be used by entities to provide data sets that may be used for ML-based SIM swap fraud risk assessment via the system and to receive warnings or other communications from the system pertaining to SIM swap fraud risk assessment (e.g., for specific identities, accounts, and/or telephone numbers).

An access management layer may maintain and enforce proper access to data, including user or data owner consent, using attribute-based access controls for example. In addition, an entity management module may define entities/parties about which data is maintained, e.g., customers, companies, mobile devices, SIM cards, telephone numbers (which may be referred to as customer telephone numbers (CTNs)), and so forth. In one example, the entity management module protects the privacy of participants by maintaining mapping of unique identifiers, e.g., using unique hashes of CTNs, SIM identifiers, user names, addresses, social media contacts, and so forth. In one example, a data management platform (e.g., a "feature store") may manage storage, indexing, tagging, findability of data features, including batch and streaming, and similar operations. In one example, a SIM swap fraud risk assessment system of the present disclosure may also include a machine learning modeling component. For instance, this may include a managed, cloud-hosted environment with tools and data sources to allow quick and secure development of ML models.

In one example, the SIM swap fraud risk assessment system may be used by a network operator to assess SIM swap fraud risk associated with telephone numbers of subscribers, e.g., using data from one or more external sources, and in one example, in combination with network event data from a communication network of the network operator. Alternatively, or in addition, the SIM swap fraud risk assessment system (or component(s) thereof, such as a feature store) may be accessed by external entities for various purposes. For instance, this may include: "features as a service" where access to shared data is provided and where participants develop their own models on their own infrastructure, "AI as a service" where access to a pre-configured cloud ML development environment plus data sources is provided for participants to develop their own models, or "risk-scoring as a service" where one or more pre-trained ML models are provided, and which may use shared data. In the latter case, participants may call the ML model at run-time, the ML model may have access to cross-organizational data, but the underlying data may not be shared with or accessible to the entity calling the ML model.

Thus, examples of the present disclosure benefit a network operator in reducing unauthorized SIM swap and malicious usage of a communication network. Similarly, the user or entity possessing the telephone number may avoid losses, inconvenience, or embarrassment that may be associated with being a victim of an unauthorized SIM swap. Likewise, financial institutions, cloud service providers, 3rd party identity verification services, online gaming platforms, social media platforms, and others may further avoid customer losses and/or direct losses associated with attempts to bypass 2FA/MFA mechanisms via SIM swap/telephone number porting. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and video services (e.g., television services, streaming service, etc.) to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of video servers (e.g., a broadcast server, a cable head-end), a plurality of content servers, an advertising server (AS), an interactive TV/video-on-demand (VoD) server, a streaming server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of network 102 may provide a cable television service, a streaming service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider, or a combination thereof, or may be operated by entities having core businesses that are not related to telecommunications services, e.g., corporate, governmental or educational institution LANs, and the like. In one example, each of the access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include a wireless access point 117 (e.g., a cellular base station).

In one example, the access networks 120 may be in communication with various devices or computing systems/processing systems, such as devices 114-116, and so forth. Similarly, access networks 122 may be in communication with one or more devices or processing systems (e.g., computing systems), such as server(s) 170, database (DB) 118, server(s) 119, etc. Access networks 120 and 122 may transmit and receive communications between devices 114-116, server(s) 170, database (DB) 118, and/or server(s) 119, application server (AS) 104 and/or database (DB) 106, other components of network 102, devices reachable via the Internet in general, and so forth.

In one example, each of the devices 114-116 may comprise a mobile computing device, a cellular smart phone, a laptop, a tablet computer, a desktop computer, a wearable computing device (e.g., a smart watch, a smart pair of eyeglasses, etc.), an application server, a bank or cluster of such devices, or the like. In one example, any one or more of the devices 114-116 may comprise a network-connected sensor device, e.g., an internet of things (IoT) device or the like. In accordance with the present disclosure, each of the devices 114 and 115 may comprise a computing system, such as computing system 400 depicted in FIG. 4, and may be configured to perform operations or functions in connection with examples of the present disclosure for performing at least one remedial action in response to a risk score associated with a telephone number for a subscriber identity module swap where the risk score is obtained via a machine learning model in accordance with an input data set associated with the telephone number from a first service provider that implements a multi-factor authentication process (such as illustrated and described in connection with the example method 300 of FIG. 3). For instance, device 114 may include one or more applications (apps) associated with one or more services in accordance with the present disclosure.

Server(s) 119 may host and may represent one or more protected services, such as servers for bank websites, cryptographic wallet providers, cryptocurrency exchange platforms, credit card providers, gaming platforms, video or audio streaming services, cloud storage or cloud computing services (including remote/cloud desktop services), social media services, online account services for utilities, retailers, medical institutions providing access to patient records, and so forth. For instance, server(s) 119 may comprise one or more servers (e.g., a web server). In one example, server(s) 119 may each include or may collectively include a database comprising one or more physical storage devices integrated with such a server, or servers (e.g., database server(s)), attached or coupled to the server(s), or remotely accessible to the server(s) to store various protected content, e.g., users' bank account records or other types of account records, which may include users' personal information, stored credit card information, crypto wallets, medical records, video, audio, multimedia, proprietary data sets, and so forth.

As illustrated in FIG. 1, access network(s) 122 may be in communication with one or more servers 170 and one or more databases (DB(s)) 118. In accordance with the present disclosure, each of the server(s) 170 may comprise a computing system or server, such as computing system 400 depicted in FIG. 4, and may individually or collectively be configured to perform operations or functions in connection with examples of the present disclosure for performing at least one remedial action in response to a risk score associated with a telephone number for a subscriber identity module swap where the risk score is obtained via a machine learning model in accordance with an input data set associated with the telephone number from a first service provider that implements a multi-factor authentication process. For instance, server(s) 170 may represent one or more authenticator services in accordance with the present disclosure.

In one example, DB(s) 118 may comprise one or more physical storage devices integrated with server(s) 170 (e.g., a database server), attached or coupled to the server(s) 170, or remotely accessible to server(s) 170 to store various types of information in accordance with the present disclosure. For example, DB(s) 118 may store various records in connection with user authentication, such as, for each user account: registered telephone numbers to be used for 2FA/MFA, a last successful authentication, a last failed authentication, and/or an authentication history, which may include location information associated with requests for secondary authentication, such as a requesting device location, requesting device network information (such as IP address, carrier and/or Internet service provider (ISP), etc.), outcomes of the secondary authentication(s), and so forth.

Figure 3:
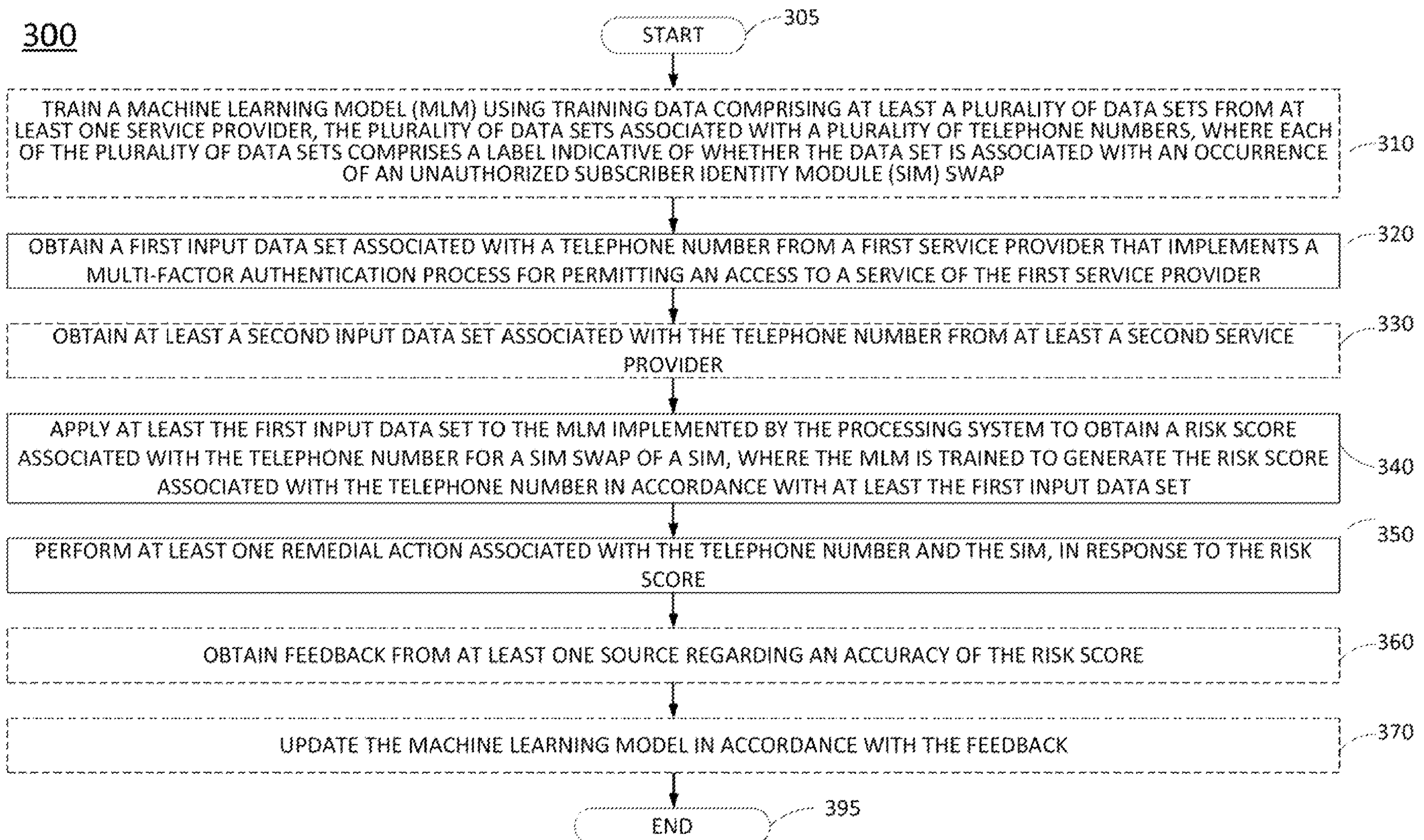
FIG. 3 illustrates a flowchart of an example method for performing at least one remedial action in response to a risk score associated with a telephone number for a subscriber identity module swap where the risk score is obtained via a machine learning model in accordance with an input data set associated with the telephone number from a first service provider that implements a multi-factor authentication process.

In the example of FIG. 1, network 102 may also include an application server (AS) 104 and a database (DB) 106. In accordance with the present disclosure, AS 104 may comprise a computing system or server, such as computing system 400 depicted in FIG. 4, and may be configured to perform operations or functions for performing at least one remedial action in response to a risk score associated with a telephone number for a subscriber identity module swap where the risk score is obtained via a machine learning model in accordance with an input data set associated with the telephone number from a first service provider that implements a multi-factor authentication process. For instance, a flowchart of an example method 300 for performing at least one remedial action in response to a risk score associated with a telephone number for a subscriber identity module swap where the risk score is obtained via a machine learning model in accordance with an input data set associated with the telephone number from a first service provider that implements a multi-factor authentication process is illustrated in FIG. 3 and described in greater detail below. For instance, network 102 may provide a supplemental service (e.g., SIM swap fraud risk assessment service) for secondary/two-factor authentications, e.g., in addition to television, phone, and/or other telecommunication services. In one example, AS 104 may comprise a data feature store and/or machine learning model development platform (e.g., a network-based and/or cloud-based service hosted on the hardware of AS 104).

Figure 4:
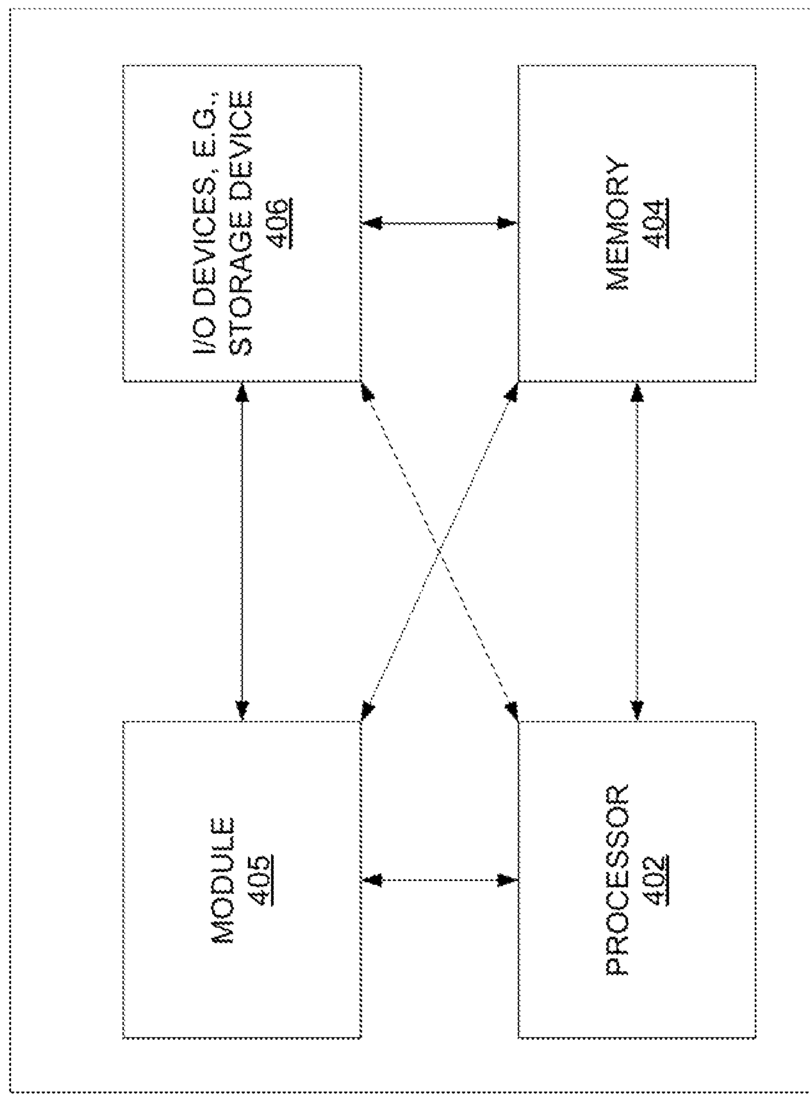
FIG. 4 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, AS 104 may train and operate a machine learning model (MLM) that is configured to generate and output SIM swap/SIM hijack risk scores in accordance with at least one data set associated with a telephone number from a first service provider that implements a multi-factor authentication process for permitting an access to a service of the first service provider (and in one example further in accordance with network event data) as inputs. It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth.

Thus, in one particular example, AS 104 may train and operate an autoencoder, or encoder-decoder network, e.g., a variational autoencoder, a shallow encoder deep decoder network, etc. In another example, AS 104 may train and operate an SVM, a neural network, such as a DNN, a model that comprises an encoder for feature extraction followed by a SVM, neural network, or the like for classification, and so forth. In the case of a neural network or autoencoder, in one example, the MLM may output a score on a continuous scale. Alternatively, the MLM may be trained to select an output value from a range of discrete output values (e.g., categories). For instance, the MLM may comprise a binary or multi-class classifier. In the case of a SVM, e.g., a binary classifier, the score may be a binary output value. Alternatively, or in addition, the score may be based upon a distance of a vector representing the input features of the MLM from a separation hyperplane in a multi-dimensional feature space. In other words, the distance may represent a likelihood score of: SIM swap fraud/no fraud and/or a risk level of being a target of SIM swap fraud. Examples of the present disclosure may include MLAs/MLMs that utilize supervised learning and/or reinforcement learning. It should be noted that various other types of MLAs and/or MLMs, or other generative and/or classification models may be implemented in examples of the present disclosure.

In one example, DB 106 may comprise one or more physical storage devices integrated with AS 104 (e.g., a database server), attached or coupled to AS 104, or remotely accessible to AS 104 to store various types of information in accordance with the present disclosure. For example, DB 106 may store data from various services providers that may be used for calculating SIM swap risk scores in accordance with the present disclosure. For instance, as noted above, these service providers may implement two-factor/multi-factor authentication processes that may include SMS or other communications directed to users' telephone numbers. The data from these service providers may include, for example: an indicator of an importance of an account associated with the telephone number, a number of failed login attempts associated with the account, an indicator of account changes to the account within a lookback time window, a history of fraud attempts associated with the account (e.g., not necessarily involving fraudulent SIM swap or circumvention of 2FA/MFA mechanisms), and so forth. The data from such service provider(s) may alternatively or additionally include an indicator of at least one activity by a user associated with the telephone number and the subscriber identity module (e.g., the at least one activity being associated with increased risk of fraud, such as activities designated as such by an operator of the service providing the data and/or the SIM swap fraud risk assessment service). For instance, the indicator may be an indicator of: a social media activity associated with an increased risk of fraud (e.g., the larger the number of viewers, subscribers, followers, etc., the potentially greater the likelihood that the individual is a target of SIM swap fraud; similarly, postings about specific topics, such as bragging about wealth, may be used as an additional predictor/ML input indicative of a greater likelihood of being a target of SIM swap fraud), a use of at least one service associated with an increased risk of fraud, an Internet browsing activity associated with an increased risk of fraud, a possession of at least one account associated with an increased risk of fraud (e.g., a cryptocurrency account holder who also holds non-fungible tokens (NFTs) may also be vulnerable to an increased risk of fraud), and so forth.

In one example, DB 106 may also store network event data that may be used for calculating SIM swap risk scores in accordance with the present disclosure. For instance, as noted above, network event data may include identifier matching data associated with telephone numbers (e.g., changes to associations among any two or more of: SIM card identifiers (e.g., ICCIDs), registered equipment identifiers (e.g., IMEIs), subscriber identifiers (e.g., IMSIs), or telephone numbers (e.g., MSISDNs)). Network event data may also include: device location data, which may include at least two locations associated with the telephone number from at least two different times (e.g., a current/most recently recorded or submitted location, and a prior recorded location), access point authentication data (e.g., an indicator of whether a device has connected to an incorrect access point, or APN), and/or malware infection data associated with the telephone number and/or device (e.g., malware infection data associated with ICCID or IMEI associated with the telephone number, or any ICCID, IMEI or MSISDN associated with a subscriber ID (IMSI) associated with the telephone number, such as for an account with multiple devices and/or telephone numbers, where a compromise of any one may be a risk factor for all). Network event data may also include unauthorized base station information (which may pertain to a location associated with the telephone number) and/or a message volume associated with the telephone number for a plurality of authentication services. For instance, network 102 may have visibility into the number of messages sent to endpoint devices from known authentication services.

In one example, DB 106 may also store data associated with one or more user-specified indicators. For instance, as noted above, a user may specify a geofence for authentication requests (e.g., permissible locations, an area, or areas where the user's device is permitted to be located for purposes of secondary/two-factor authentication, etc.), and so forth. In one example, at least a portion of the network event data and/or user-specific data may be stored in a user account record, e.g., a subscriber record, such as the associations between identifiers, the user-specific indicators (e.g., current selections of the user for user-specific indicators, if applicable), location records associated with a telephone number (e.g., MSISDN), a device (e.g., IMEI), and/or SIM (e.g., ICCID), and so forth. In one example, network event data and/or data associated with user-specified indicators may be derived from other records of network 102 that may be stored in DB 106 or elsewhere, and which may be separately retained (or not) according to various data retention policies. For instance, in one example, fine-grained device location data is not stored, but records of locations for prior secondary authentication requests may be retained separately for purposes of the present disclosure and for a longer period of time, e.g., with the user's consent and/or at the direction of the user.

Although only a single AS 104 and DB 106 are illustrated in FIG. 1, it should be noted that any number of application servers and/or databases may be deployed to perform the same or similar operations in a distributed and/or coordinated manner. Thus, AS 104 may represent multiple application servers. Alternatively, or in addition, DB 106 may represent multiple database servers. In one example, AS 104 and/or DB 106 may comprise cloud-based and/or distributed data storage and/or processing systems comprising one or more servers at a same location or at different locations. For instance, DB 106, or DB 106 in conjunction with AS 104, may represent a distributed file system, e.g., a Hadoop® Distributed File System (HDFS™), or the like. In one example, AS 104, DB 106, server(s) 170, DB(s) 118, device 114, device 115, device 116, and/or server(s) 119, may operate in a distributed and/or coordinated manner to perform various steps, functions, and/or operations described herein.

In an illustrative example, a user 185 via device 115 may seek to access a protected service that may have secondary authentication protection enabled (e.g., 2FA/MFA). For instance, the protected service may be hosted on, and accessible at or via one or more of server(s) 119. For instance, the user 185 may be using a home or work computer to check the user's financial records that have been uploaded to server(s) 119 (e.g., a bank website). Thus, for example, the user 185 may access a webpage or use an application (app) interface to enter a username and password. The username and password may be received at server(s) 119 and verified for correctness. In one example, the user 185 may also be presented with one or more challenge questions, such as first school, father's middle name, favorite car, etc. For illustrative purposes, in the present example, it may be assumed that user 185 has entered the correct information. However, in one example, in the event that incorrect information is entered, the failure to provide proper access credentials may be recorded. In one example, server(s) 119 may also notify AS 104 of such failure. For instance, for each failure, or periodically and/or when a threshold number of failures across all users accessing the protected service are gathered, the server(s) 119 (e.g., the protected service) may notify AS 104. AS 104 may store such records and/or update records for telephone numbers associated with accounts exhibiting such primary authentication failures.

In accordance with the present disclosure, upon successful primary authentication, a secondary authentication (e.g., two-factor authentication) may be initiated. In the example of FIG. 1, the protected service (represented by server(s) 119) may engage a third-party authenticator service for this process. For instance, in the example of FIG. 1, one or more authenticator services may be represented by server(s) 170. Accordingly, the protected service may transmit a request to the authenticator service to engage in a secondary authentication of user 185. In one example, the secondary authentication may include a transmission of a text message (e.g., a short message service (SMS) message) to a cellular device associated with the user 185 (e.g., device 114). In another example, the secondary authentication may include a transmission of an application specific message (e.g., an over-the-top (OTT) application message). For instance, device 114 may include a dedicated authenticator application (app) for receiving such a message.

In one example, the message (text message or OTT message) may include a code that the user 185 is tasked with obtaining from the message via device 114, and which the user is instructed to enter via an interface of device 115. For instance, a user may enter a username and password via a first screen of a user interface presented via device 115. Upon successful primary authentication, a second screen may be presented for entry of a secondary authentication code (e.g., two-factor authentication code) that is transmitted to and presented via device 114. In another example, an OTT application message may cause an associated app on device 114 to present an interface with selectable buttons, or the like from which user 185 may select "yes" or "no," etc. to indicate that the user 185 is attempting to access the protected service or has authorized the access to the user's account with the protected service.

It should also be noted that in either case (text message or OTT message) the secondary authentication message may be directed to a telephone number designated by the user, e.g., in connection with the user's account with the protected service and/or the authenticator service. In one example, network 102 and one or more of the access network(s) 120 may represent a cellular network. In such case, components of network 102 (e.g., a cellular core network) and/or the one or more of access network(s) 120 may identify an IMSI associated with such telephone number of user 185 and may forward the message (e.g., a text message) toward a current serving gateway (SGW) and base station of an associated device (e.g., device 114) as recorded for the IMSI. For instance, a home subscriber server (HSS), or the like may store an association between IMSI and MSISDN, and may identify where the device 114 is located. The text message may thus be forwarded to device 114 based on the association between the IMSI and telephone number (MSISDN) (e.g., by a short message service center (SMSC) server or the like retrieving the destination information from the HSS). Similarly, a packet data network gateway (PDN-GW or PGW) associated with an IP address assigned to device 114 may receive an over-the-top (OTT) message for device 114, and may forward the message to device 114 via a packet data protocol (PDP) context for the device 114 (e.g., including at least the SGW and serving base station (such as wireless access point 117 in access network(s) 120)).

The foregoing describes secondary authentication processes where device 114 and the associated telephone number is/are not compromised. However, it is possible that device 114 is lost and/or stolen. In addition, device 114 and/or the SIM thereof may be subject to SIM swapping/SIM hijacking, and other attacks.

In one example, an attacker (e.g., user 184) may engage in a SIM swap and/or SIM hijacking of the telephone number of user 185. For example, user 184 may impersonate user 185 during a phone call with a customer service center of the operator of network 102 and/or access network(s) 120 (e.g., a cellular carrier network). In addition, user 184 may successfully convince the network operator/carrier to cause the telephone number of user 185 previously associated with device 114 to now be associated with the SIM of device 116. In this case, if user 184 successfully navigates a primary authentication of a protected service, the secondary authentication communication directed to the associated telephone number may instead be forwarded to device 116.

Notably, risk factors present in data from one or more sources external to a network operator infrastructure (e.g., network 102 and/or access network(s) 120, access network(s) 122, etc.), may be indicative of events preceding a fraudulent SIM swap or occurring as part of or in conjunction with a fraudulent SIM swap such as outlined above. For example, in order to impersonate a legitimate user associated with a telephone number, a fraudulent entity may first obtain various personal details of the user, such as mother's maiden name, father's date of birth, home address, etc. To illustrate, a user, such as user 185 may make social media post wishing the father of user 185 a happy birthday. Similarly, user 185 may have publicly posted two years earlier about purchasing a house, complete with links to a listing giving the house address, and so forth. In one example, a data set associated with the telephone number may be provided by a social network platform (e.g., one of the server(s) 119) and stored in DB 106. Similarly, an email address and password associated with the telephone number (e.g., of an account holder thereof, such as user 185) may have been stolen as part of a data breach several months earlier. Although user 185 may have changed the password, the user may have reused the same password, or close variants thereof, for various accounts with various other service providers. At the same time, a fraudulent entity (e.g., user 184, an associate of user 184, etc.) may make many attempts to access these various accounts. As such, data from any one or more of these services relating to a volume and/or frequency of login attempts for various accounts associated with the telephone number may be provided by server(s) 119, stored in DB 106, and used as inputs to a machine learning model implemented by AS 104 for generating SIM swap risk score. Additional examples of relevant data from various services providers that may be obtained and used as inputs/predictors for the MLM are described above.

As noted above, in one example, network event data may also be used in conjunction with a data set, or data sets from one or more external entities as one or more additional inputs to the MLM. Thus, for example, location information associated with the telephone number from mobile device location tracking may be indicative of a SIM swap or SIM hijack, e.g., where the change results in a significant and/or sudden change in location. In addition, changes in the association between telephone number, ICCID, IMEI, etc. may also be indicative of such attacks and may be recorded in the network event data stored in DB 106. It should be noted that any one or more of these or other factors may be present in one or more data sets from various service providers (and in one example, additionally in network event data associated with the telephone number). When input to the MLM of AS 104, the resultant SIM swap risk score may thus be correspondingly higher (e.g., indicating a greater likelihood of the phone number and/or device 114 being compromised) or lower (e.g., indicating a greater likelihood that the attempted access is legitimate and initiated by the authorized user 185).

In one example, the network 102, e.g., via AS 104 may implement at least one remedial action in a communication network associated with the telephone number (and the associated SIM), in response to the risk score. For example, network 102 may prevent an attempted change to a communication network account associated with the telephone number. For instance, the telephone number may be prevented from being associated with a different SIM (e.g., a different device) than the SIM to which the telephone number has been associated, may be prevented from being ported to a different carrier, and so forth. In one example, the network 102 may alternatively or additionally prevent a delivery of at least one communication to a device (SIM) having an association with the telephone number that is less than a threshold duration of time (where the communication is directed to the telephone number). For instance, user 184 may have successfully convinced a personnel of the network operator/carrier to cause the telephone number of user 185 previously associated with device 114 to instead be associated with the SIM of device 116. However, AS 104 may detect that the SIM swap risk score has exceeded a threshold indicative of "high risk," for example. In this case, AS 104 may temporarily halt delivery of communications to device 116. In other words, this may address a SIM swap/hijack that may already have occurred or that is in progress.

Alternatively, or in addition, AS 104 and/or one or more other components of network 102 may transmit a warning to at least one recipient entity other than a device having an association with the telephone number. For instance, this may include an email directed to an email address, a text or call to another telephone number, etc. The at least one recipient entity may alternatively or additionally include one or more protected services (e.g., one or more of server(s) 119) and/or one or more authenticator services (e.g., represented by one or more of server(s) 170). For instance, user 185 may opt-in and may provide to AS 104 identifications of one or more services used by user 185. In one example, a warning may identify the telephone number that is the subject of the warning. In one example, the warning may further include a risk level (e.g., high, medium, low, etc. and/or the actual risk score itself). In one example, the warning may include account identifier(s) of the user's account(s) with such service provider(s) to enable the service provider(s) to correlate the warnings received with the appropriate account(s). However, in another example, the telephone number alone may be sufficient to identify the affected account(s).

In this regard, to further mitigate and to prevent the effects of these attacks, as well as negative impacts with other service providers (such as unauthorized access to bank accounts, medical records, or other personal information, such as contact lists, shared media, messages, etc., proprietary data, and so forth), network 102 may, as noted above, provide a supplemental service for secondary/two-factor authentications, e.g., in addition to television, phone, and/or other telecommunication services. In particular, for a secondary authentication for user 185 attempting to access a protected service via device 115, an authenticator service (e.g., represented by one or more of server(s) 170) and/or the protected service (e.g., represented by one or more of server(s) 119) may request a SIM swap risk score from AS 104 with respect to the telephone number of user 185. In this regard, AS 104 may calculate a SIM swap risk score via a machine learning model and may provide the score (or a risk level/category derived from the score, such as high risk, medium risk, low risk, or the like) to the authentication service and/or the protected service (e.g., in accordance with the example method 300 of FIG. 3 and/or as described elsewhere herein).

In response, the authenticator service and/or the protected service may take any number of further actions, such as to permit the access to the protected service (e.g., one or more of server(s) 119) via device 115, to deny the access, to provide a limited access, such as preventing access to certain content or features that would otherwise be available to user 185, and so forth. In one example in which the protected service is not notified directly by AS 104, the authenticator service may communicate with the protected service to provide a decision or outcome of the secondary authentication, where the protected services may take any one or more actions in response. For instance, the authenticator service may pass along the score, may provide an "admit" or "deny" recommendation (or a different gradation, such as "admit with restrictions"), and so forth.

In addition, in one example, the authenticator service and/or the protected service may provide feedback to AS 104 regarding the correctness of the score. For instance, if a "low" score is provided and access is authorized, but the authenticator service and/or the protected service receives an account recovery request from user 185 indicating that the account appears to have been hijacked, this may be provided as feedback to AS 104. Similarly, for a "high" score that prevented access or resulted in granting of only limited access to the protected service, the authenticator service and/or the protected service may receive an inquiry from user 185, such as via a telephone call, where the user 185 verifies his or her identity with other factors, the false classification, e.g., the incorrectness of the "high" SIM swap risk score, may be provided as feedback to AS 104. In one example, the feedback may be used in a reinforcement learning framework to retrain and update the MLM. However, in one example, not all feedback may be used for reinforcement learning. For instance, it may be the case that a high SIM swap risk score is predominantly the result of device 114 being detected to be infected with malware. The legitimate user 185 may be the one seeking to access the protected service, but the use of the device 114 for secondary authentication remains correctly suspect. Thus, in one example, this type of feedback may be noted, but not used to retrain the MLM. Additional steps, functions, operations, or other aspects of AS 104 or other components of system 100 are also described in greater detail below in connection with the example of FIG. 2.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos, music or other audio, or other content in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114, server(s) 119, and server(s) 170 may be in communication with network 102 via different access networks, and so forth.

In addition, device 116 may use a different access network than device 114, such as entirely different cellular carrier networks. For instance, a malicious actor, e.g., user 184 with device 116, may be located in a different part of the same country or even a different country from the user 185 and device 114. It should also be noted that although the foregoing is described primarily in connection with a third party authenticator service, in other, further, and different examples, a protected service may implement two-factor/secondary authentication on its own, such as managing its own external short message entity (ESME) that may send SMS messages via Short Message Peer-to-Peer Protocol (SMPP). Thus, in one example, a protected service and an authenticator service may be a singular entity. It should also be noted that the foregoing describes an example in which user 185 is seeking to access a protected service using device 115, where device 114 is used for secondary authentication. However, in still another example, user 185 may seek to access the protected service using device 114, where device 114 is also used for the secondary authentication. For instance, user 185 may seek to access his or her bank account via the user's mobile device (e.g., device 114) that is also associated with the phone number for secondary authentication. Thus, these and other modifications are all contemplated within the scope of the present disclosure.

Figure 2:
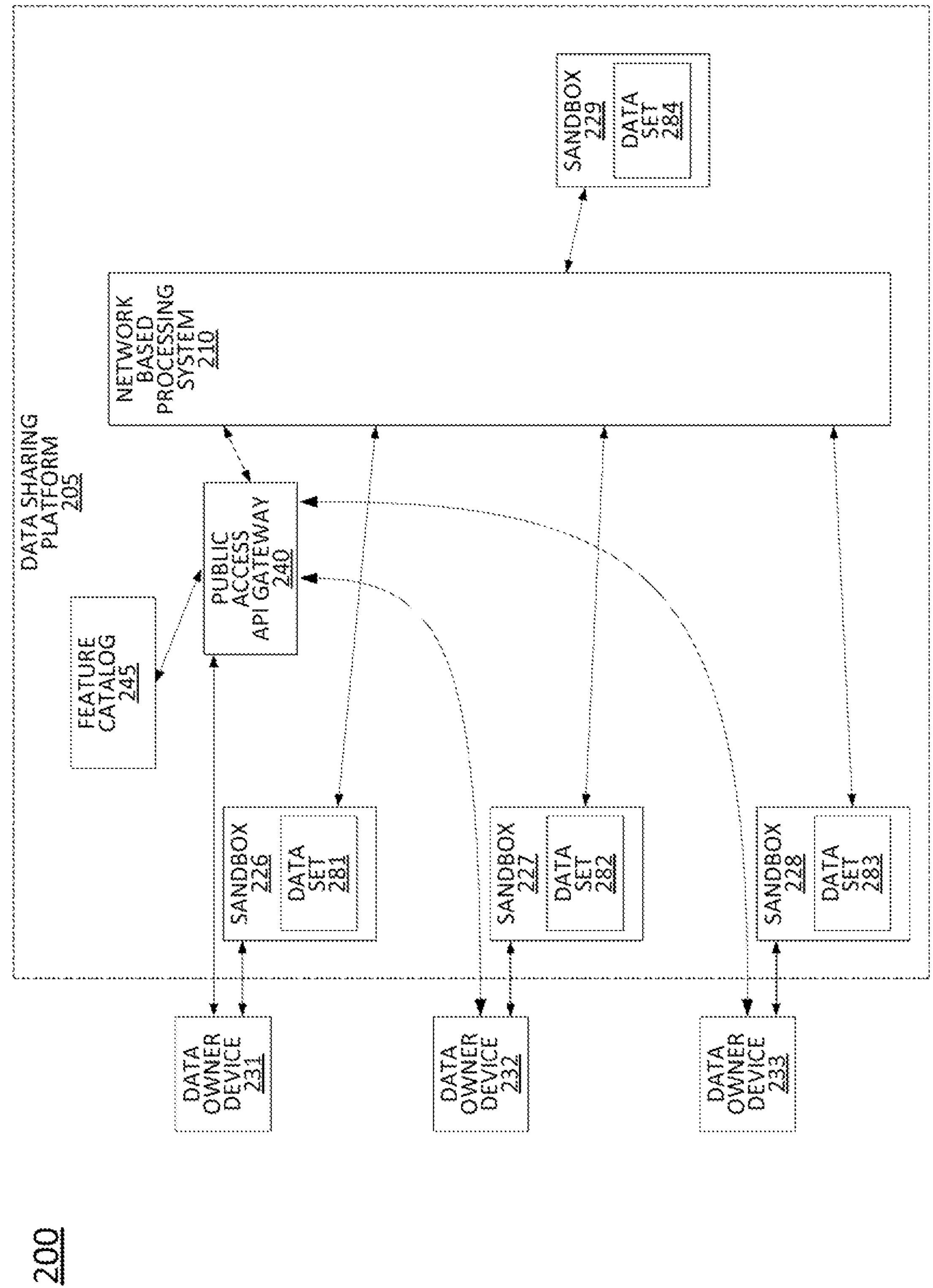
FIG. 2 illustrates an example system including a data sharing platform, according to the present disclosure.

FIG. 2 illustrates an example system 200 including a data sharing platform 205 (e.g., a network-based data sharing platform). In one example, the data sharing platform 205 may comprise a processing system, e.g., a server or multiple servers collectively configured to perform various steps, functions, and/or operations in accordance with the present disclosure. In one example, the data sharing platform 205 includes a network-based processing system 210, e.g., a server or multiple servers collectively configured to perform various steps, functions, and/or operations in accordance with the present disclosure. In one example, data sharing platform 205 may be represented by AS 104 and/or DB 106 in FIG. 1, or vice versa. In one example, the network-based processing system may comprise all or a portion of a computing device or system, such as computing system 400, and/or processing system 402 as described in connection with FIG. 4 below, specifically configured to perform various steps, functions, and/or operations in accordance with the present disclosure. It should also be noted that the components of network-based processing system 210 and the data sharing platform 205 may comprise various combinations of computing resources (e.g., processor(s), memory unit(s), and/or storage unit(s)) on the same or different host devices, at the same or different locations (e.g., in the same or different data centers). For example, processors assigned to execute instruction sets for different components may be separate from the associated memory resources, which may be separate from associated storage resources where data sets or other data are stored, and so on.

As further illustrated in FIG. 2, the data sharing platform includes a plurality of sandboxes 226-229 (e.g., "private sandboxes') and a public access application programming interface (API) gateway 240. In various examples, sandboxes 226-229, the data sets 281-284 stored in the different sandboxes 226-229, and/or the public access API gateway 240 may comprise virtual machines, application containers, or the like operating on one or more host devices. In addition, each of sandboxes 226-229, the data sets 281-284 stored in the different sandboxes 226-229, and/or the public access API gateway 240 may comprise various combinations of computing resources, e.g., processor(s), memory unit(s), and/or storage unit(s) on one or more shared host devices and/or on separate host devices. Each of the data sets 281-284 may take a variety of different forms. However, for illustrative purposes, data sets 281-284 may be considered to each include at least one table (e.g., containing at least one row and at least one column). In any case, each of the data sets 281-284 may include at least one data feature. In addition, at least some of the data features may comprise restricted data features, e.g., available for limited use by other entities via the data sharing platform 205, as described herein. In addition, for illustrative purposes, the data sharing platform 205 may comprise a relational database system (RDBS). However, in other, further, and different examples, data sharing platform 205 may comprise a different type of database system, such as a hierarchical database system, a graph-based database system, etc.

In one example, each of sandboxes 226-228 may comprise a feature store. In one example, any one or more of the sandboxes 226-228 may be separately hosted and maintained by the respective data owners (e.g., which may correspond to server(s) 119, server(s) 170, AS 104/DB 106, etc. of FIG. 1). In another example, any one or more of the sandboxes 226-228 may be hosted on shared infrastructure within the network-based processing system 210 (e.g., where a trusted entity controls and operates the data sharing platform, but where the data owners have independent control and access of the respective sandboxes 226-228 and the data sets 281-283 stored therein). For instance, a provider of a machine learning model development service via the data sharing platform 205 may also securely and separately store data sets 281-283 in sandboxes 226-228 on behalf of the respective data owners (e.g., as separate components of a feature store, or as multiple feature stores having features that are collectively accessible via the data sharing platform 205).

The data sharing platform 205 may provide services to a number of different users, and interact with a number of user devices, such as data owner devices 231-233. Each of the user devices may comprise a desktop computer, a cellular smart phone, a laptop, a tablet computer, a cloud based processing system providing a user environment, and so forth. In particular, data sharing platform 205 may be operated by a trusted party to store data sets on behalf of data owners in a secure and restricted manner, to provide for the use of restricted data features, e.g., for training of machine learning models via the data sharing platform 205 in accordance with authorizations from the data owners, and so on. To illustrate, sandbox 226 may store data set 281 for a first data owner, which may comprise network operational data (e.g., network event data) collected from a communication network, such as access point authentication data associated with the telephone number, malware infection data associated with the telephone number, identifier matching data associated with the telephone number (e.g., account changes, such as changing an email address of a subscriber account associated with telephone number, adding another authorized individual to an account, changing an address associated with the account, etc.), a message volume associated with the telephone number, a message volume associated with the telephone number specific to a plurality of authentication services, unauthorized base station information pertaining to a location associated with the telephone number, and so forth. Additional data from a network operator that may be used for ML-based SIM swap detection may include a number of attempted in-person transactions at retail locations of the network operator, a geographic distribution of the locations, and so forth, a number of attempted online account changes that are not necessarily related to an account identifier, and so on. The data set 281 may include raw data and/or may include data that have been normalized, transformed, tagged, etc. before uploading to the data sharing platform 205. In one example, the data in data set 281 may be uploaded via data owner device 231 and stored in sandbox 226. Alternatively, or in addition, the data sharing platform 205 may be configured to obtain and/or receive the data comprising data set 281 directly from a telecommunication network infrastructure (not shown). The sandbox 226 may represent a secure data storage and data processing environment that is only accessible to the first data owner (or another person or entity authorized on behalf of the first data owner) and to the network-based processing system 210.

Similarly, sandbox 227 may store data set 282 for a second data owner, which may comprise a financial institution (e.g., a financial service provider). The data set 282 may include raw data and/or may include data that have been normalized, transformed, tagged, etc. before uploading to the data sharing platform 205. In one example, the data in data set 282 may be uploaded via data owner device 232 and stored in sandbox 227. Alternatively, or in addition, the data sharing platform 205 may be configured to obtain and/or receive the data comprising data set 282 directly from a server of the financial service provider (not shown). The data may include records/data sets relating to each of a plurality of accounts with the financial service provider, and may include data such as: an indicator that an account associated with a telephone number (e.g., a customer having the telephone number) is a high-value account, a number of recent login attempts, a number of successful login attempts, a geographic distribution of login attempts, user agent or device identifiers associated with the login attempts, recent changes to account information, e.g., a new address, a new authorized credit card holder, and so forth. The sandbox 227 may represent a secure data storage and data processing environment that is only accessible to the second data owner (or another person or entity authorized on behalf of the second data owner) and to the network-based processing system 210.

In addition, sandbox 228 may store data set 283 for a third data owner, which may comprise a social media platform. The data set 283 may include raw data and/or may include data that have been normalized, transformed, tagged, etc. before uploading to the data sharing platform 205. In one example, the data in data set 283 may be uploaded via data owner device 233 and stored in sandbox 228. Alternatively, or in addition, the data sharing platform 205 may be configured to obtain and/or receive the data comprising data set 283 directly from a server of the social media platform (not shown). The data may include records/data sets relating to each of a plurality of accounts with the social media platform such as, for each account: a telephone number associated with the account, an indicator of whether the same customer associated with the telephone number is also a prolific social media contributor with a large number of subscribers, followers, friends, or the like (or a measure of the level of usage, reach, or the like), information identifying whether the account is associated with posts about specific topics (e.g., financial subjects, or more specific types of financial subject, such as cryptocurrency, etc.), and so forth. The sandbox 228 may represent a secure data storage and data processing environment that is only accessible to the third data owner (or another person or entity authorized on behalf of the third data owner) and to the network-based processing system 210.

In one example, the various data owners may make portions of the data sets 281-283 available to other users of the data sharing platform 205 (e.g., other entities) as "restricted features," e.g., features that are not accessible to the other entities for viewing, data exploration, etc., but which may be used for machine learning model training via the network-based processing system 210 of the data sharing platform 205. In one example, each of the sandboxes 226-228 may comprise a separate feature store that is dedicated to a respective data owner associated with one of the data owner devices 231-233. In another example, data sharing platform 205 may comprise a feature store in which data owners contribute respective data sets that are securely stored in a segregated manner, e.g., in separate sandboxes 226-228 with different encryption keys, different access codes/password protection, etc.

In one example, the data sharing platform 205 may provide access to a data feature catalog 245, e.g., via public access API gateway 240. The data feature catalog 245 may include information about data features available from the various data sets 281-283 in the various sandboxes 226-228. For instance, the information may include data feature metadata including, for each data feature: a data feature label/name, ownership information, an ontology, a text description (e.g., provided by a data owner), lineage information, a data profile (e.g., statistical information of the data feature, including a date/time range, mean, median, high value, low value, entropy, etc.), a data type, format, and/or schema, machine learning models that have been trained using the data feature, ratings or comments of other users of the data feature, recommendations of similar data features, complementary data features, and so forth. In an example in which data sharing platform 205 supports restricted and non-restricted data features, the data feature catalog 245 may also identify for each data feature whether the data feature is restricted or not. In one example, a data feature may also be provided with different access/permission levels. For instance, a data set owner may designate one or more external entities for having unrestricted access to a data feature, while the data feature may remain "restricted" for any other entities.

Thus, for example, a requesting entity, e.g., via one of the data owner devices 231-233, may access the data feature catalog 245 and may identify the availability of the data feature(s) deemed of interest to the training of a machine learning model. For illustrative purposes, the requesting entity may be associated with data owner device 231 (e.g., a communication network operator). In one example, once the requesting entity identifies the data feature(s) of interest from the data sets 281-283, the requesting entity may then request training of a machine learning model in accordance with the data feature(s) from the respective data sets 281-283. For illustrative purposes, it may be assumed that at least some of the desired feature(s) comprise restricted data features of one or more other data owners to which the requesting entity is not entitled to access. As such, in accordance with the present disclosure, the machine learning model may be uploaded to the network-based processing system 210 via the public access API gateway 240 for training via the data sharing platform 205 on behalf of the requesting entity.

In one example, a sandbox 229 may be instantiated for this task and the uploaded machine learning model may be placed therein. Alternatively, the data sharing platform 205 may comprise a complete machine learning model development platform. Thus, the machine learning model may be created from a template (e.g., a machine learning algorithm with various pre-set or user-selected hyperparameters) that is available via an MLM catalog/repository of the data sharing platform 205. In one example, partial development of the machine learning model may be provided via sandbox 226, such as hyperparameter selection, training of the MLM via the data owner's own data features, etc.

In one example, the network-based processing system 210 may access any data features of other data owners that is/are to be used to train the MLM, e.g., from data set 282 and/or data set 283, and may populate such features into data set 284 of sandbox 229. In one example, data set 284 may comprise only those features that will be used for the specific MLM training. In one example, the network-based processing system 210 may be permitted to access various restricted data features as a trusted intermediary/third party, wherein no human (unless separately permitted by the data owner(s)) is enabled to access the respective restricted data feature(s). For instance, only the network-based processing system 210 and the respective data feature owner may have an encryption/decryption key to the respective sandbox, the respective data set, and/or the respective data feature.

It should be noted that in one example, the request may specify that the machine learning model is to be trained using at least one data feature of the requesting entity (e.g., from data set 281). As such, one or more of these data features may be retrieved from data set 281 and populated into data set 284. Alternatively, or in addition, the requesting entity may upload one or more new data features for training the MLM, e.g., via data owner device 231, which may also be populated into data set 284 (and in one example, into data set 281, e.g., for future use by the data owner and/or other entities as restricted or non-restricted data feature(s)). Similarly, it should be noted that at least one data feature of another entity that is to be used for training the MLM may be non-restricted (at least with respect to the requesting entity). However, in any case, since the MLM is to be trained using at least one restricted data feature, the training will nevertheless take place via sandbox 229 that is inaccessible to the requesting entity. As such, restricted and non-restricted features of the requesting entity and of other data owners may all be populated into data set 284.

Accordingly, the network-based processing system 210 may commence training of the MLM via sandbox 229 in accordance with the data features in data set 284, at least one of which comprises a restricted data set of another data owner. In various examples, the training may include validation and/or testing. It should be noted that as referred to herein, a machine learning model (MLM) (or machine learning-based model), may broadly include models for prediction, classification, forecasting, and/or detection, and may comprise a machine learning algorithm (MLA) that has been "trained" or configured in accordance with input data (e.g., training data) to perform a particular service, e.g., to generate SIM swap risk scores for subject telephone numbers and/or to detect SIM swap/SIM hijack instances (e.g., when the risk score exceeds a threshold, or the like). Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, MLAs/MLMs of the present disclosure may be in accordance with an open source library, such as OpenCV, which may be further enhanced with domain specific training data.

In one example, an MLM trained via sandbox 229 may be returned to the requesting entity, e.g., at data owner device 231 and/or sandbox 226. Notably, although the MLM may have been trained using one or more restricted data features, the trained MLM may be accessed, used, and deployed by the requesting entity, e.g., for whichever purpose(s) the MLM was intended to serve. It should be noted that although the MLM may have been trained with one or more restricted data features as predictors/independent variables, the requesting entity may obtain permission or may have the authorization to access and use additional input data that may be related to such restricted data features. For instance, a restricted data feature may comprise a user's social media posting topics, a number of subscribers/friends, etc. Other restricted features may include a value of the user's assets in custody of a financial institution, a user's in-person credit card usage history, and so forth. For example, the user may specifically provide consent via a pop-up request presented by an application of a user's mobile computing device or the like. However, in another example, the MLM may be deployed at the data sharing platform 205 (e.g., via network-based processing system 210 or via one or more other components (not shown)). In this case, to the extent any one or more of the run-time inputs/predictors may comprise "restricted" data, such data may be accessed by the data sharing platform 205, e.g., while remaining inaccessible to the requesting entity for which the MLM may be deployed.

In one example, the sandbox 229 may be closed and the data set 284 released after the MLM is trained and provided back to the requesting entity. For instance, the sandbox 229 may be instantiated as a virtual machine, container, or the like, and may be de-instantiated upon completion of the MLM training. In one example, any storage, memory, or other resources utilized for the restricted data features may be overwritten and/or other similar preventative measures implemented to further prevent data leakage. In one example, the network-based processing system 210 may provide feedback to one or more data owners of restricted and/or non-restricted data features that may have been used for MLM training, e.g., an identification of the MLM, the purpose and/or subject matter of the MLM, an identification of the requesting entity for which the MLM was trained, etc. In one example, the feedback may comprise user feedback obtained from the requesting entity, e.g., a one to five star rating, a zero to ten rating, any comments about the data feature and/or a performance of the MLM, etc. In one example, one or more aspects of such feedback may alternatively or additionally be added to one or more entries associated with one or more data features in the feature catalog 245, which may be discovered by other requesting entities when seeking to train additional MLMs in the future.

It should be noted that although the foregoing describes an example in which a data owner is also the requesting entity obtaining MLM training via data sharing platform 205, in another example, a requesting entity may not be a "data owner," but could be another entity that seeks MLM training using at least one restricted data feature that is made available and may be found in feature catalog 245. It should also be noted that in one example, an entity seeking MLM training is not prevented from requesting full access to a restricted data feature from a data owner. For example, the data owner may grant such permission, may deny the request at the data owner's discretion, may request further information on the intended use, etc. in accordance with any legal, regulatory, contractual or other obligations, or the like. In addition, although the present disclosure provides for enhanced protection of data features by preventing access of non-authorized entities to restricted data features, in some examples, various data cleansing, anonymizing, or similar transformations or protections may be applied to various data features, such as omission of house numbers for street addresses or generalization to city/state and/or zip code only, storing of hash values for names, homomorphic encryption for certain values, replacing specific values with randomly selected values within a band/range of values, etc. It should also be noted that in one example, a data set owner may also be a provider of the data sharing platform 205. For instance, a communication network may be a host/provider of the data sharing platform 205 and may maintain restricted data features for limited use by other entities in data set 281. Thus, these and other modifications are all contemplated within the scope of the present disclosure.

FIG. 3 illustrates a flowchart of an example method 300 for performing at least one remedial action in response to a risk score associated with a telephone number for a subscriber identity module swap where the risk score is obtained via a machine learning model in accordance with an input data set associated with the telephone number from a first service provider that implements a multi-factor authentication process, in accordance with the present disclosure. In one example, the method 300 is performed by a component of the system 100 of FIG. 1, such as by application server 104 and/or any one or more components thereof (e.g., a processor, or processors, performing operations stored in and loaded from a memory), by AS 104 in conjunction with one or more other entities, such as DB 106, server(s) 170, DB(s) 118, server(s) 119, and so forth. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may train a machine learning model (MLM) using training data comprising at least a plurality of data sets from at least one service provider, the plurality of data sets associated with a plurality of telephone numbers, wherein each of the plurality of data sets comprises a label indicative of whether the data set is associated with an occurrence of a unauthorized subscriber identity module swap. For instance, each of the plurality of data sets may comprise a label indicative of whether a known instance of SIM swap/SIM hijacking is associated with a respective telephone number. In one example, the machine learning model may be configured with a plurality of inputs/predictors and an output of a SIM swap/SIM hijack risk score associated with a telephone number. As noted above, the inputs/predictors may include data from one or more service providers, such as: banks, cryptographic wallet providers, cryptocurrency exchange platforms. credit card providers, gaming platforms, video or audio streaming services, cloud storage or cloud computing services, social media platforms, online account services for utilities, retailers, medical institutions providing access to patient records, and so forth. The data may include, for example: an indicator of an importance of an account associated with the telephone number, a number of failed login attempts associated with the account, an indicator of account changes to the account within a lookback time window, a history of fraud attempts associated with the account, an indicator of at least one activity by a user associated with the telephone number and SIM (e.g., where the at least one activity is associated with an increased risk of fraud).

As noted above, the inputs/predictors may also include network event data predictors (e.g., associated with the elements of network event data sets). In one example, the inputs/predictors may further include user-specified indicators, and so forth. In one example, the MLM may comprise an autoencoder. In other examples, the MLM may comprise an SVM, a neural network, such as a DNN, a model that comprises an encoder for feature extraction followed by a SVM, or the like for classification. The MLM may incorporate supervised learning or reinforcement learning. In the case of a neural network or autoencoder, in one example, the MLM may output an authenticity score on a continuous scale. Alternatively, the MLM may be trained to select an output value from a range of discrete output values (e.g., categories). For instance, the MLM may comprise a binary or multi-class classifier. In the case of a SVM, e.g., a binary classifier, the SIM swap/SIM hijack risk score may be a binary output value. Alternatively, or in addition, the score may be based upon a distance of a vector representing the input features of the MLM from a separation hyperplane in a multi-dimensional feature space. In other words, the distance may represent a likelihood score of SIM swap/SIM hijack (e.g., that has occurred, may occur, or that is in progress).

At step 320, the processing system obtains a first input data set associated with a telephone number from a first service provider that implements a multi-factor authentication process for permitting an access to a service of the first service provider. The first service provider may comprise, for example, a bank or other financial institutions, a cryptographic wallet provider, a cryptocurrency exchange platform, a credit card provider, a gaming platform, a video or audio streaming service, a cloud storage or cloud computing service, a social media platform, a utility service provider (e.g., water, natural gas, electricity, sewerage, etc.), an online retailer, a medical institution, a third-party authenticator service, and so forth. The first input data set may comprise, for example, one or more of: an indicator of an importance of an account associated with the telephone number, a number of failed login attempts associated with the account, an indicator of account changes to the account within a lookback time window; a history of fraud attempts associated with the account, location information for at least one activity by a user associated with the telephone number and the SIM, or the like. In one example, the first input data set may include an indicator of at least one activity by a user associated with the telephone number and the SIM (e.g., where the at least one activity is associated with an increased risk of fraud). For instance, the at least one activity may include a social media activity associated with an increased risk of fraud, a use of at least one service associated with an increased risk of fraud, an Internet browsing activity associated with an increased risk of fraud, a possession of at least one account associated with an increased risk of fraud, and so forth. In one example, the first service provider may be the same as a service provider from which at least a portion of the training data is obtained. However, in one example, the first service provider may not contribute to the training data. For example, the MLM may be trained with at least a portion of the training data that is from a second financial institution, and where the first service provider is a first financial institution. For instance, the first input data set may include data (e.g., elements of the first data set) that is of the same type as data (e.g., data elements) in the training data, only from a different financial institution.

At optional step 330, the processing system may obtain at least a second input data set associated with the telephone number from at least a second service provider. In one example, the first input data set may comprise at least a first element from among a plurality of potential elements that may include: an indicator of an importance of an account associated with the telephone number, a number of failed login attempts associated with the account, an indicator of account changes to the account within a lookback time window, a history of fraud attempts associated with the account, an indicator of at least one activity by a user associated with the telephone number and subscriber identity module, etc., and the at least the second input data set may comprise at least a second element from among the plurality of potential elements that is different from the at least the first element. In other words, the first input data set and the at least the second input data set may be from different service providers and may comprise complementary data elements.

In one example, the at least the second input data set may alternatively or additionally comprise a network event data set associated with a telephone number. For instance, this may include network-derived location information associated with the telephone number, which may indicate an implausible change in location, or which can be used with other location data, such as location data from credit card transactions to indicate a disconnect. For instance, the credit card usage location information may be legitimate, but the network location data may be suspect (and possibly indicative of fraudulent SIM swap/SIM hijack). In various examples, the network event data set may alternatively or additionally include at least one of: access point authentication data associated with the telephone number, malware infection data associated with the telephone number, identifier matching data associated with the telephone number, and so forth. For instance, authentication with a rouge access point or an incorrect access point may indicate a potential compromise (and hence likely a higher SIM swap/SIM fraud risk score when used as an input to the MLM). Likewise, malware infection data associated with the telephone number may include malware infection data associated with an ICCID or IMEI associated with the telephone number (e.g., an MSISDN), or any one of: an ICCID, IMEI, or MSISDN associated with a subscriber ID (IMSI) associated with the telephone number. In one example, the network event data set may include a message volume associated with the telephone number for a plurality of authentication service (e.g., within a recent time period, such as 12 hours, 24 hours, 36 hours, etc.). Similarly, the identifier matching data associated with the telephone number may comprise data indicative of whether a change has occurred regarding at least one identifier associated with the telephone number (e.g., an MSISDN). For instance, the at least one identifier may comprise at least one of: a SIM card ID (e.g., an ICCID), a registered equipment ID (e.g., an IMEI), or a subscriber ID (e.g., an IMSI).

It should also be noted that in one example, each of the plurality of data sets of the training data may comprise data of a same type as the first input data set and the at least the second input data set. For instance, elements of each training data set may have a corresponding data type to one of the elements of the first input data set or one of the at least the second input data set (however, it should be noted that this does not exclude that some fields/predictors may be blank or missing from any of the training data sets, the first input data set, and/or the at least the second input data set). As such, in one example, the machine learning model may be trained to generate the risk score associated with the telephone number in accordance with the first input data set and the at least the second input data set.

At step 340, the processing system applies at least the first input data set to the MLM implemented by the processing system to obtain a risk score associated with the telephone number for a SIM swap of a SIM (e.g., a SIM swap/SIM hijack risk score), where the MLM is trained to generate the risk score associated with the telephone number in accordance with at least the first input data set. In one example, the MLM may be trained to generate the risk score further in accordance with the at least the second input data set. In such an example, step 340 may comprise applying both the first input data set and the at least the second input data set to the MLM to obtain the risk score.

At step 350, the processing system performs at least one remedial action associated with the telephone number and the SIM, in response to the risk score. In one example, the at least one remedial action may be performed in response to the SIM swap/SIM hijack risk score exceeding a threshold, in response to the SIM swap/SIM hijack risk score changing by more than a threshold amount or percentage since a last calculation of a SIM swap/SIM hijack risk score for the same telephone number, or the like. For instance, the at least one remedial action may comprise preventing an attempted change to a communication network account associated with the telephone number and the SIM. For example, this may include blocking changes to association(s) between SIM card ID (e.g., an ICCID), a registered equipment ID (e.g., an IMEI), or a subscriber ID (e.g., an IMSI), or the like. Alternatively, or in addition, this may comprise preventing changes to registered name(s), username(s), email addresses, alternative forms of communication, billing address(es), and so forth. In one example, the at least one remedial action may comprise preventing a delivery of at least one communication to a device (SIM) having an association with the telephone number that is less than a threshold duration of time, the communication being directed to the telephone number. For instance, if the telephone number has been associated with a new SIM for less than 24 hours after having been previously associated with another SIM for two years, the delivery of a text message to the new device (based on the association of the telephone number with the new SIM) may be prevented. For instance, the text message may be quarantined, delayed, etc. In other words, the processing system may instruct one or more components of the communication network to not deliver calls, texts (including 2FA messages), etc. to another device that may have recently been associated with the telephone number (e.g., a fraudulent SIM swap that may have already occurred or is in progress).

In one example, the at least one remedial action may alternatively or additionally include transmitting a warning to at least one recipient entity other than a device having an association with the telephone number (e.g., an email directed to an email address, a text or call to another telephone number, etc.). For instance, the at least one recipient entity may be an alternate device and/or identity of the user or an associate of the user (e.g., a trusted family member, co-worker, etc.). As such, the user and/or an associate of the user may contact the communication network operator to confirm that SIM swap/SIM hijack is likely or to indicate a false positive. For instance, the user may move to a new state and may also obtain a new mobile phone on the same day (while attempting to transfer the telephone number to the new device/new SIM), which in combination with elements of the first input data set may cause a high SIM swap/SIM hijack risk score. In one example, the at least one recipient entity may include the first service provider and/or the at least the second service provider. For instance, the processing system may be deployed and operated by a communication network, where one or more warnings may be provided to one or more other service providers designated by the user, and which may benefit from a notification of SIM swap/SIM hijack risk level (e.g., the user's bank, credit card company, social media provider, medical service provider, a third-party authenticator service, etc., which may implement 2FA/MFA authentication processes).

At optional step 360, the processing system may obtain feedback from at least one source regarding an accuracy of the risk score. For example, the feedback may include the telephone number, a transaction identifier, time stamp, and a resolution (FALSE/TRUE, or the like). The processing system may thus store records relating to SIM swap/SIM hijack risk scores, e.g., data set(s) and associated scores/outcomes, for calculating an accuracy of the risk scoring, and for retraining and/or reinforcement learning. The at least one source may comprise the user and/or an associate of the user, network personnel (e.g., after speaking with the user and/or manual confirmation of an occurrence of SIM swap/SIM hijack (or a non-occurrence thereof)), another service provider (e.g., the user's bank may confirm SIM hijack has occurred based upon its own determination), and so forth.

At optional step 370, the processing system may update the machine learning model in accordance with the feedback. For instance, the updating may comprise retraining the machine learning model, e.g., where the MLM is associated with a supervised learning framework. For example, the input data set and associated feedback may comprise an additional labeled training data example to be used for retraining. In one example, older training data may be replaced by newer training data, or may be supplemented by newer training data. In one example, the updating may comprise adjusting the network connections, weights, etc. of the MLM, e.g., in a reinforcement learning (RL) framework. For instance, an MLM with RL may attempt to minimize one or more loss functions on an ongoing basis. Following step 350 or one of the optional steps 360-370, the method 300 proceeds to step 395 wherein the method 300 ends.

It should be noted that the method 300 may be expanded to include additional steps, or may be modified to replace steps with different steps, to combine steps, to omit steps, to perform steps in a different order, and so forth. For instance, in one example the processing system may continue to repeat one or more steps of the method 300, such as steps 320-350 for various telephone numbers, steps 320-350 for additional SIM swap/SIM hijack risk checks regarding the same or different telephone number, and so forth. In one example, the method 300 may include obtaining a request for a SIM swap/SIM hijack risk score, e.g., from the first service provider or one of the at least the second service provider. Alternatively, or in addition, SIM swap/SIM hijack risk scores may be calculated on an ongoing basis (e.g., for use by the communication network in determining whether to implement one or more remedial actions in accordance with step 350 and/or to be made available to be provided upon request to one or more other services providers). In one example, a requesting entity or another service provider recipient of the risk score may apply a policy based on the score, e.g., to allow or deny a request to access a user account associated with the telephone number, etc. In one example, the processing system may store features (e.g., data sets) that may be provided to various services providers for MLM training/development. In one example, the processing system may host a feature store and/or MLM development platform, e.g., where MLMs may be trained with data sets of one or more other entities and where data protections may be implemented such that the MLM developer does not necessarily have access to view the underlying data on which the MLM(s) is/are trained. In one example, the method 300 may be expanded or modified to include steps, functions, and/or operations, or other features described above in connection with the example(s) of FIG. 1 and/or FIG. 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 and/or FIG. 2, or described in connection with the example(s) of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for performing at least one remedial action in response to a risk score associated with a telephone number for a subscriber identity module swap where the risk score is obtained via a machine learning model in accordance with an input data set associated with the telephone number from a first service provider that implements a multi-factor authentication process, and various input/output devices 406, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for performing at least one remedial action in response to a risk score associated with a telephone number for a subscriber identity module swap where the risk score is obtained via a machine learning model in accordance with an input data set associated with the telephone number from a first service provider that implements a multi-factor authentication process (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s)

can be perceived as a programmed processor or a specialized processor. As such, the present module 405 for performing at least one remedial action in response to a risk score associated with a telephone number for a subscriber identity module swap where the risk score is obtained via a machine learning model in accordance with an input data set associated with the telephone number from a first service provider that implements a multi-factor authentication process (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

obtaining, by a processing system, a first input data set associated with a telephone number from a first service provider that implements a multi-factor authentication process for permitting an access to a service of the first service provider;

obtaining, by the processing system, at least a second input data set associated with the telephone number from at least a second service provider for a second service of the second service provider, wherein the first service provider is distinct from the second service provider;

applying, by the processing system, at least the first input data set and the at least second input data set to a machine learning model implemented by the processing system to obtain a risk score associated with the telephone number for a subscriber identity module swap of a subscriber identity module, wherein the machine learning model is trained to generate the risk score associated with the telephone number in accordance with at least the first input data set and the at least second input data set; and performing, by the processing system, at least one remedial action associated with the telephone number and the subscriber identity module, in response to the risk score.

2. The method of claim 1, wherein the at least the second input data set comprises a network event data set associated with the telephone number.

3. The method of claim 2, wherein the network event data set includes network-derived location information associated with the telephone number.

4. The method of claim 3, wherein the first input data set includes location information for at least one activity by a user associated with the telephone number and the subscriber identity module.

5. The method of claim 2, wherein the network event data set includes at least one of:

access point authentication data associated with the telephone number;

malware infection data associated with the telephone number; or identifier matching data associated with the telephone number.

6. The apparatus of claim 1, the operations further comprising:

training the machine learning model using training data comprising at least a plurality of data sets associated with a plurality of telephone numbers, wherein each of the plurality of data sets comprises a label indicative of whether the each data set is associated with an occurrence of an unauthorized subscriber identity module swap.

7. The method of claim 2, wherein each of the plurality of data sets of the training data comprises data of a same type as the first input data set and at least a second input data set.

8. The method of claim 1, further comprising:

obtaining feedback from at least one source regarding an accuracy of the risk score; and updating the machine learning model in accordance with the feedback.

9. The method of claim 8, wherein the at least one source comprises:

a user device of a user associated with the telephone number and the subscriber identity module;

a component device of the communication network;

a user device of a personnel of the communication network; or a user device associated with the first service provider.

10. The method of claim 1, wherein the first input data set comprises an indicator of at least one activity by a user associated with the telephone number and the subscriber identity module, wherein the at least one activity is associated with an increased risk of fraud.

11. The method of claim 10, wherein the at least one activity comprises:

a social media activity associated with an increased risk of fraud;

a use of at least one service associated with an increased risk of fraud;

an internet browsing activity associated with an increased risk of fraud; or a possession of at least one account associated with an increased risk of fraud.

12. The method of claim 1, wherein the first input data set comprises at least one of:

an indicator of an importance of an account associated with the telephone number;

a number of failed login attempts associated with the account;

an indicator of account changes to the account within a lookback time window; or a history of fraud attempts associated with the account.

13. The method of claim 1, wherein the at least one remedial action comprises preventing an attempted change to a communication network account associated with the telephone number and the subscriber identity module.

14. The method of claim 1, wherein the at least one remedial action comprises preventing a delivery of at least one communication to a device having an association with the telephone number that is less than a threshold duration of time.

15. The method of claim 1, wherein the at least one remedial action comprises:

transmitting a warning to at least one recipient entity other than a device having an association with the telephone number.

16. A non-transitory computer-readable medium storing instructions which, when executed by a processing system including at least one processor when deployed in a communication network, cause the processing system to perform operations, the operations comprising:

obtaining a first input data set associated with a telephone number from a first service provider that implements a multi-factor authentication process for permitting an access to a service of the first service provider;

obtaining at least a second input data set associated with the telephone number from at least a second service provider for a second service of the second service provider, wherein the first service provider is distinct from the second service provider;

applying at least the first input data set and the at least second input data set to a machine learning model implemented by the processing system to obtain a risk score associated with the telephone number for a subscriber identity module swap of a subscriber identity module, wherein the machine learning model is trained to generate the risk score associated with the telephone number in accordance with at least the first input data set and the at least second input data set; and performing at least one remedial action associated with the telephone number and the subscriber identity module, in response to the risk score.

17. An apparatus comprising:

a processing system including at least one processor; and a non-transitory computer-readable medium storing instructions which, when executed by the processing system when deployed in a communication network, cause the processing system to perform operations, the operations comprising:

obtaining a first input data set associated with a telephone number from a first service provider that implements a multi-factor authentication process for permitting an access to a service of the first service provider;

obtaining at least a second input data set associated with the telephone number from at least a second service provider for a second service of the second service provider, wherein the first service provider is distinct from the second service provider;

applying at least the first input data set and the at least second input data set to a machine learning model implemented by the processing system to obtain a risk score associated with the telephone number for a subscriber identity module swap of a subscriber identity module, wherein the machine learning model is trained to generate the risk score associated with the telephone number in accordance with at least the first input data set and the at least second input data set; and performing at least one remedial action associated with the telephone number and the subscriber identity module, in response to the risk score.

18. The apparatus of claim 17, the operations further comprising:

obtaining feedback from at least one source regarding an accuracy of the risk score; and updating the machine learning model in accordance with the feedback.

19. The apparatus of claim 18, wherein the at least one source comprises:

a user device of a user associated with the telephone number and the subscriber identity module;

a component device of the communication network;

a user device of a personnel of the communication network; or a user device associated with the first service provider.

20. The apparatus of claim 17, the operations further comprising:

training the machine learning model using training data comprising at least a plurality of data sets associated with a plurality of telephone numbers, wherein each of the plurality of data sets comprises a label indicative of whether the each data set is associated with an occurrence of an unauthorized subscriber identity module swap.

* * * * *